United States Patent [19]

Pav et al.

[11] Patent Number: 4,520,723
[45] Date of Patent: Jun. 4, 1985

[54] PRESSURE ROLL FOR USE IN CALENDERS OR THE LIKE

[75] Inventors: Josef Pav; Reinhard Wenzel, both of Krefeld, Fed. Rep. of Germany

[73] Assignee: Kleinewefers GmbH, Krefeld, Fed. Rep. of Germany

[21] Appl. No.: 565,282

[22] Filed: Dec. 27, 1983

[30] Foreign Application Priority Data

Jul. 14, 1983 [DE] Fed. Rep. of Germany ....... 3325385

[51] Int. Cl.³ .............................................. B30B 3/04
[52] U.S. Cl. ............................. 100/162 B; 29/116 AD
[58] Field of Search .............. 100/162 B; 29/116 AD, 29/113 AD, 116 R

[56] References Cited

U.S. PATENT DOCUMENTS

| 4,092,916 | 6/1978 | Link et al. | 29/116 AD |
| 4,328,744 | 5/1982 | Pav et al. | 29/116 AD |
| 4,357,743 | 11/1982 | Hefter et al. | 29/116 AD |
| 4,372,205 | 2/1983 | Pflaum | 29/116 AD |
| 4,447,940 | 5/1984 | Appenzeller et al. | 29/116 AD |

FOREIGN PATENT DOCUMENTS 576916  5/1933  Fed. Rep. of Germany .... 29/116 R

Primary Examiner—Peter Feldman
Attorney, Agent, or Firm—Peter K. Kontler

[57] ABSTRACT

A pressure roll for use in a calender has a beam whose end portions are mounted in a stationary frame and which is spacedly surrounded by a hollow cylindrical shell. Groups of hydrostatic supporting elements are installed in the space between the shell and the beam, and each such group has several supporting elements, as considered in the circumferential direction of the shell. Each supporting element has several hydraulic pressure transmitting cylinder and piston units which are adjacent to each other, as considered in the circumferential direction of the shell. The axis of the shell is held in a supporting plane which includes the axis of the pressure roll as well as the axis of an adjacent roll, and such retention of the axis of the shell in the supporting plane is effected exclusively by regulating the pressure of hydraulic fluid in selected pressure transmitting units. The end portions of the shell are movable radially of the respective portions of the beam.

32 Claims, 15 Drawing Figures

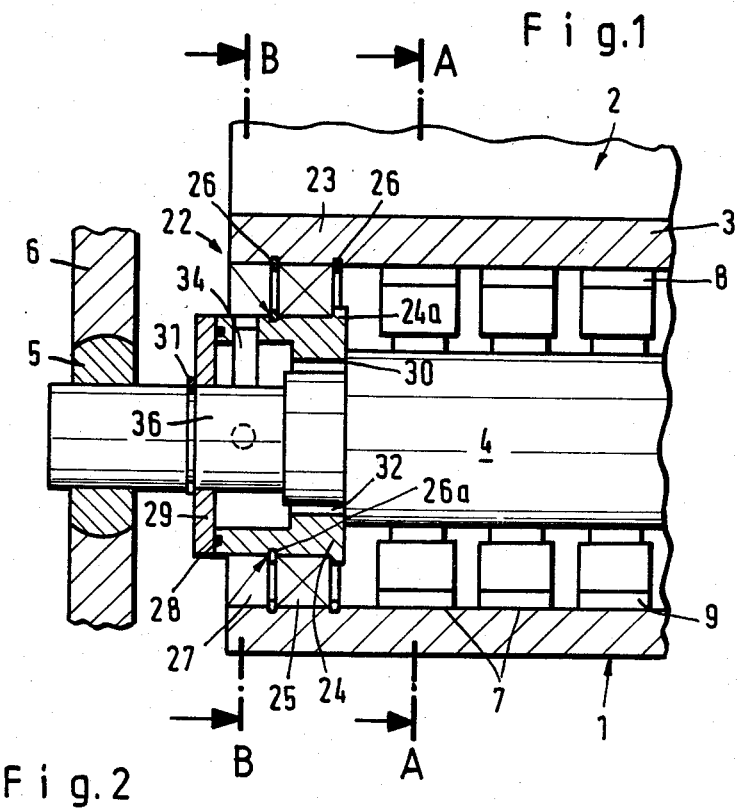
Fig.1
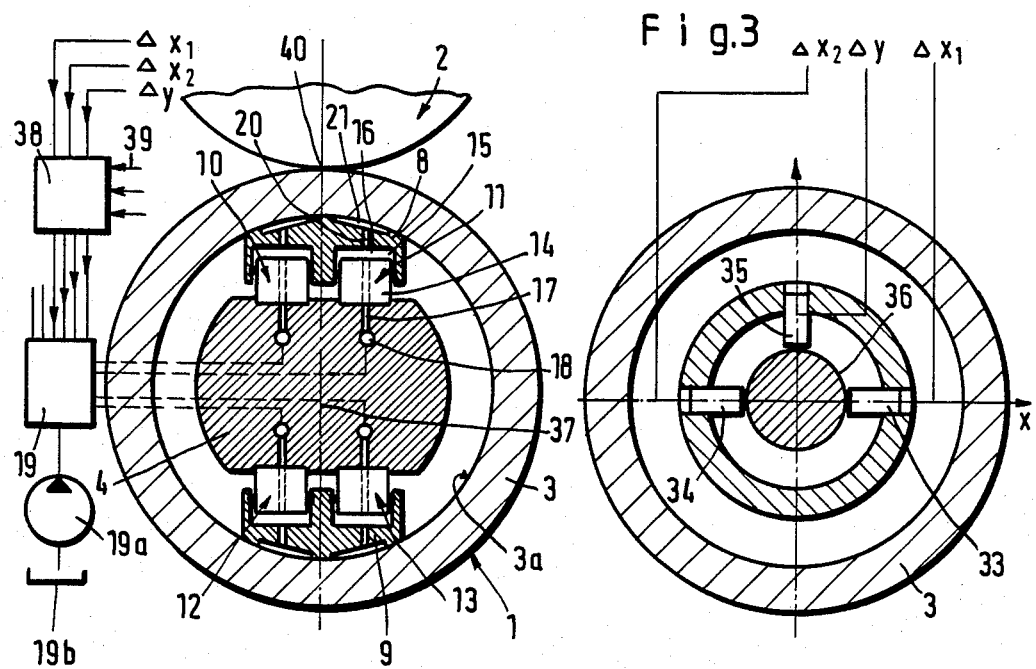
Fig.2
Fig.3

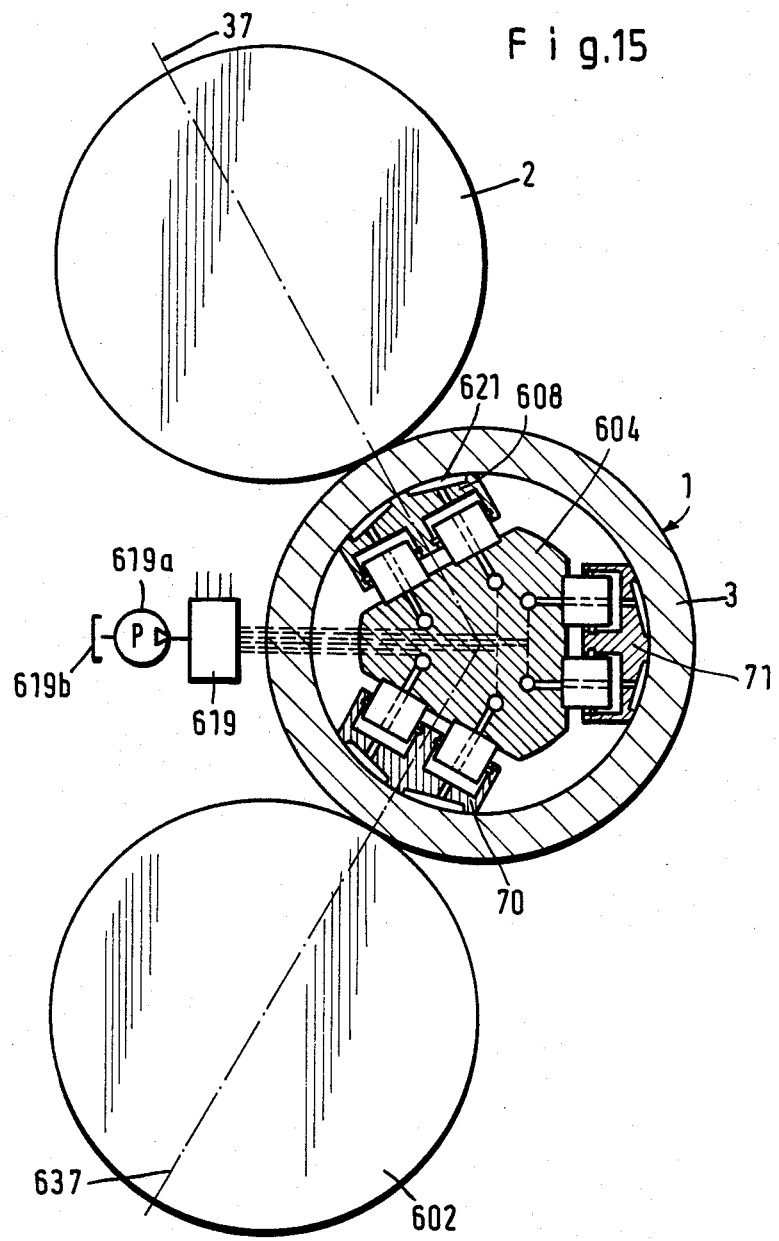

PRESSURE ROLL FOR USE IN CALENDERS OR THE LIKE

BACKGROUND OF THE INVENTION

The present invention relates to pressure rolls which can be used in calenders and like machines to apply pressure to the surfaces of running webs of paper, textile material or the like. More particularly, the invention relates to improvements in pressure rolls of the type wherein a hollow cylindrical shell is rotatable about a stationary carrier and is centered on such carrier by one or more rows of hydraulic supporting elements.

The end portions of the carrier for the shell of a pressure roll of the above outlined character are mounted in the frame of the machine. It is further known to mount on the carrier bearing units for the end portions of the shell and to provide each bearing unit with an inner bearing element which is installed in the respective end portion of the shell and is held against axial movement with reference to the carrier. Such inner bearing element can serve as a part of, or it may constitute, a thrust bearing and/or it can perform the function of a seal for the respective end portion of the shell. The hydraulic supporting elements ensure that the external surface of the shell bears against the external surface or surfaces of one or more adjoining pressure rolls, e.g., in a calender wherein a running web must be advanced through the nips of two or more cooperating rolls to enhance the quality of its surfaces and/or other characteristics. Analogous pressure rolls can be used with advantage in smoothing, grinding, embossing, printing, pressing or other types of machines for the treatment of webs of textile material, synthetic plastic material or paper as well as in rolling mills for steel or other metallic materials.

British Pat. No. 641,466 discloses a pressure roll wherein hydraulic plungers constitute supporting elements and their end faces abut against the internal surface of the shell. The plungers form a row intermediate the axis of the shell and the nip between such shell and the adjoining pressure roll. By changing the pressure in the cylinder chambers for the plungers, one can regulate the pressure between the shell and the adjoining pressure roll, and it is also possible to lower the shell away from contact with the adjacent pressure roll by permitting some or all of the hydraulic fluid to escape from the cylinder chambers. The bearing unit at each axial end of the shell comprises an outer bearing element which is secured to the respective end portion of the shell and an inner bearing element which is spacedly surrounded by the outer bearing element so that the two bearing elements provide room for insertion of an antifriction roller bearing therebetween. The bearing units which are disclosed in the aforementioned British patent are capable of taking up axial stresses, i.e., of transmitting axial stresses from the shell to the carrier which supports the hydraulic supporting elements and is surrounded by the shell. When the cylinder chambers for the plungers are disconnected from the source of pressurized hydraulic fluid and are connected to the sump, the inner bearing elements of the two bearing units serve as stops which limit the extent of downward movement of the shell, i.e., the inner bearing elements intercept the shell after the latter moves its external surface through a predetermined distance in a direction away from the adjacent pressure roll. In other words, the inner bearing elements of the two bearing units limit the extent of radial movement of the shell with reference to its carrier. The bearing units which are disclosed in the British patent are further equipped with means for sealing the respective ends of the shell, i.e., for preventing the penetration of impurities into the interior of the shell and/or for preventing escape of lubricant from the shell.

German Pat. No. 1,026,609 discloses a modified pressure roller wherein the radial movements of the shell with reference to its carrier can take place only in a so-called supporting plane, namely, in a plane which includes the axis of the shell and the axis of the adjoining pressure roll. This is achieved by providing the carrier with guide means which permit the shell to move radially of the carrier but confine the radial movement to that in the just mentioned supporting plane. The guide means comprise radially extending pins or studs whose axes are located in the supporting plane and which are anchored in the end portions of the shell to extend into complementary bores or holes of the carrier, or vice versa. Analogous guide means are disclosed in German Pat. No. 22 54 392 wherein the carrier has diametrically extending bores for the pins or pairs of movement-restricting surfaces which are parallel to the supporting plane. Reference may also be had to U.S. Pat. No. 3,885,283 granted May 27, 1975 to Biondetti.

A drawback of the aforedescribed conventional pressure rolls is that the guide means and/or the bearing units prevent highly accurate adjustments of the shell with reference to its carrier and/or with reference to the cooperating pressure roll as well as that the pressure between the external surface of the shell and the external surface of the adjoining pressure roll cannot be selected with a requisite degree of precision. Moreover, the pressure cannot be regulated with the same degree of accuracy all the way between the two axial ends of the shell.

A further pressure roll is disclosed in commonly owned U.S. Pat. No. 4,328,744, granted May 11, 1982 to Pav et al., which employs hydrostatic supporting elements each having a battery of cylinder and piston units disposed one next to the other, as considered in the circumferential direction of the shell. Each cylinder and piston unit can receive pressurized fluid independently of the other cylinder and piston units to thus ensure a much more accurate adjustment of pressure between the peripheral surface of the shell and the external surface of the adjacent pressure roll. The patent to Pav et al. further discloses that the shell can surround two rows of hydrostatic supporting elements, namely, a row above and a row below the carrier. This further increases the number of possible adjustments, for example, so as to compensate for the resultants of several forces acting upon the shell in two or more different directions. Such forces can include the force of gravity, the bias of the adjoining pressure roll and the forces which are applied by a running web of textile or other material advancing through the nip of the shell and the adjacent pressure roll.

OBJECTS AND SUMMARY OF THE INVENTION

An object of the invention is to provide a novel and improved pressure roll which can be used in calenders or like machines and is constructed and assembled in such a way that the pressure between its shell and one or more adjoining pressure rolls can be selected and maintained with a heretofore unmatched degree of accuracy and predictability.

Another object of the invention is to provide a pressure roll wherein the shell can be held in a selected optimum position with reference to its carrier and the adjoining pressure roll or rolls in a simple and inexpensive way.

A further object of the invention is to provide a pressure roll which can be installed in existing calenders or other types of machines as a superior substitute for heretofore known pressure rolls.

An additional object of the invention is to provide a pressure roll whose shell can be moved to and held in such position that the pressure between the external surface of the shell and the external surface or surfaces of one or more adjoining pressure rolls can be established and maintained with a heretofore unmatched degree of accuracy all the way from the one to the other axial end of the shell as well as at each axial end.

A further object of the invention is to provide novel and improved means for transmitting axially oriented forces between the shell and the carrier of the improved pressure roll.

An additional object of the invention is to provide the pressure roll with novel and improved means for sealing the end portions of its shell.

Still another object of the invention is to provide a novel and improved method of mounting the shell of a pressure roll on its carrier and of regulating the pressure between the external surface of such shell and the external surface or surfaces of the neighboring pressure roll or rolls.

Another object of the invention is to provide a pressure roll of the above outlined character with novel and improved means for confining the shell to radial movements in directions which are parallel to the supporting plane of the roll.

The invention is embodied in a calender or another machine which employs sets of cooperating rolls defining one or more nips for the passage of running webs of textile material, paper or the like. The machine comprises first and second pressure rolls which define a nip and whose axes are normally disposed in a common supporting plane, e.g., in a vertical plane. In accordance with a feature of the invention, at least one of the rolls comprises a stationary carrier (e.g., an elongated horizontal beam whose end portions are mounted in a stationary frame or an analogous support), a hollow rotary cylindrical shell which surrounds the carrier and whose end portions are movable in the supporting plane radially of the other roll, and groups of supporting elements installed in the interior of the shell and being adjacent to one another, as considered in the axial direction of the shell. Each group of supporting elements includes at least two supporting elements which are spaced apart from one another, as considered in the circumferential direction of the shell, and each supporting element comprises a plurality of pressure transmitting units (preferably in the form of cylinder and piston units) disposed next to each other, as considered in the circumferential direction of the shell. The shell is subject to the action of external forces (such as gravity and/or the force which is exerted by a running web passing through the nip of the two rolls) having components acting at least upon the end portions of the shell substantially at right angles to the supporting plane, and the pressure transmitting units are operable to react against the carrier and to apply to the shell internal forces having components acting substantially at right angles to the supporting plane. The machine further comprises regulating means serving to operate some or all of the pressure transmitting units (depending on the prevailing circumstances) so as to effect the generation of internal forces whose components at least substantially neutralize the components of the external forces to thus maintain the axes of the end portions of the shell in the supporting plane.

The machine further comprises first and second bearing units which are movable with the corresponding end portions of the shell radially of the other roll. Each such bearing unit comprises an annular outer bearing element which is provided on (and can form part of or can constitute) the respective end portion of the shell, and an annular inner bearing element which is surrounded by the corresponding outer bearing element and is radially movably mounted on the carrier. One of the functions of the bearing units is preferably to enable the outer bearing elements to transmit axially orientated forces from the shell to the respective end portions of the carrier by way of the corresponding inner bearing elements. Each bearing unit can comprise or constitute means for at least substantially sealing the interior of the respective end portion of the shell from the surrounding atmosphere.

The pressure transmitting units of at least one supporting element in each of the aforementioned groups of supporting elements can be at least substantially mirror symmetrical to one another with reference to the supporting plane. It is also possible to provide in each group a pair of supporting elements which are at least substantially mirror symmetrical to one another with reference to the supporting plane. If each group comprises more than two supporting elements, two supporting elements of each group are preferably disposed at the opposite sides of the supporting plane. Alternatively (e.g., if each group comprises two supporting elements disposed at the opposite sides of the carrier), the supporting plane can halve each supporting element. If each group comprises three supporting elements, a first supporting element of each group is preferably disposed between the carrier and the other roll and the two additional supporting elements of each group are disposed at the opposite sides of the supporting plane. The additional supporting elements of each such group are preferably mirror symmetrical to each other with reference to the supporting plane. The length of each supporting element, as considered in the axial direction of the shell, is preferably less than the width of the respective supporting element, as considered in the circumferential direction of the shell. This renders it possible to accommodate a large number of groups between the two axial ends of the shell.

In accordance with another feature of the invention, the improved machine can further comprise means for holding the inner bearing elements of the two bearing units against rotation with the shell. Thus, the shell is rotatable with reference to the inner bearing elements. The outer bearing elements are in contact with the respective inner bearing elements and rotate with the shell so that the inner bearing elements exhibit a tendency to rotate with the shell at least substantially exclusively as a result of direct or indirect contact with the respective outer bearing elements. The holding means includes means for counteracting such tendency of the inner bearing elements, and such counteracting means preferably comprises stationary first arresting means provided on the support for the carrier and/or on the carrier proper, and second arresting means cooperating with the first arresting means and provided on the inner bearing elements. The arrangement is preferably such that the second arresting means have limited freedom of angular movement with reference to the first arresting means. The first arresting means can comprise stationary projections (e.g., rollers or otherwise configurated rotary elements), and the second arresting means then preferably comprises pairs of guide faces provided on the inner bearing elements and flanking the respective projections. Such guide faces can be provided in substantially radially extending grooves of the respective inner bearing elements, and the width of each groove slightly exceeds the diameter of the respective rotary element or elements. This ensures that each second arresting means is movable with a minimum of friction in the radial direction of the other roll. If the projections are provided on the inner bearing elements, the radially extending grooves of the guide faces are provided on the adjacent portions of the carrier. If the stationary projections are provided on the carrier and/or on the support for the carrier, the grooves and the guide faces are provided on the inner bearing elements. Each first arresting means can comprise a single arresting member (e.g., a roller on the carrier) for each of the two bearing units. The projections are preferably nearer to the internal surface of the shell than to the external surface of the carrier.

In accordance with one of the presently preferred embodiments of the invention, each bearing unit can constitute or include a spherical joint. Also, the inner and the outer bearing elements can define between themselves hydrostatic lubricating surfaces to reduce the friction between such bearing elements.

The transmission of axial forces from the shell to the carrier can take place by way of cooperating end faces which are (or can be) provided on the inner and outer bearing elements of each bearing unit, and such cooperating end faces can also define between themselves hydrostatic lubricating recesses to reduce friction between the inner and outer bearing elements. The means for transmitting axial forces from the inner bearing elements to the carrier comprises first components provided on the carrier and second components provided on the inner bearing elements and arranged to move radially of the carrier, with a minimum of friction, with reference to the corresponding first components in response to radial movement of the end portions of the shell with reference to the carrier. One of the first and second components preferably includes one or more rollers or otherwise configurated rotary elements, and the other component has an end face against which the rotary elements abut and along which the rotary elements roll when the respective end portion of the shell moves radially relative to the carrier.

The machine preferably further comprises signal generating means for monitoring the positions of the end portions of the shell with reference to the carrier and means (e.g., a computer) for influencing the regulating means as a function of the characteristics of signals denoting the monitored positions of the end portions of the shell. The monitoring means can comprise a pair of mechanical, electrical or other sensors disposed at the opposite sides of the supporting plane at each end of the shell and serving to monitor the extent of radial movement of the respective end portion of the shell at right angles to the supporting plane. Such monitoring means can further comprise a third sensor provided at each end of the shell and serving to monitor the extent of radial movement of the respective end portion of the shell in the supporting plane.

The shell can be provided with an elastic outer layer which can consist of or include paper.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary axial sectional view of a pressure roll which embodies one form of the invention and a fragmentary elevational view of a cooperating upper pressure roll;

FIG. 2 is a transverse vertical sectional view as seen in the direction of arrows from the line A—A of FIG. 1;

FIG. 3 is a transverse vertical sectional view as seen in the direction of arrows from the line B—B of FIG. 1;

FIG. 4 is a fragmentary axial sectional view of a second pressure roll and a fragmentary elevational view of a pressure roll which defines with the second pressure roll a nip for a web of paper or the like;

FIG. 15 illustrates the structure of FIG. 14 plus a third roll.

DESCRIPTION OF THE PREFERRED EMBODIMENTS

Figure 4:
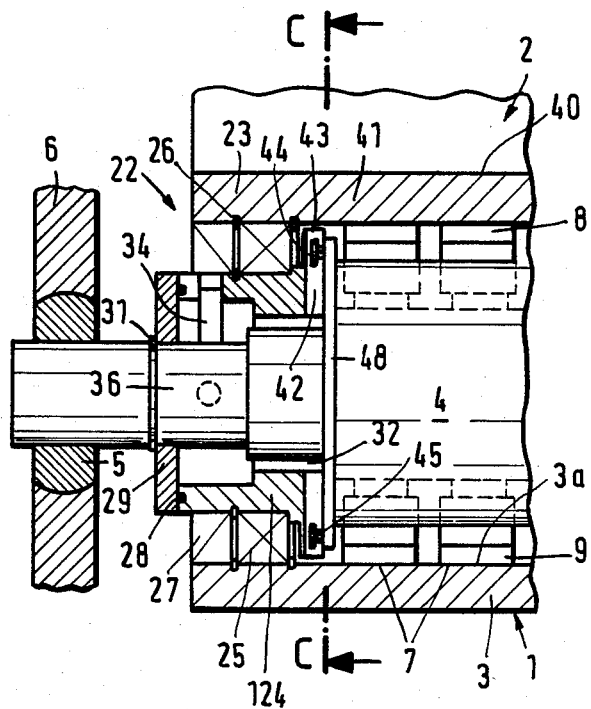

The pressure roll 1 which is shown in FIGS. 1 to 3 cooperates with a similar or different pressure roll 2 to define therewith a nip 40 for the passage of a web of textile material, a web of paper or any other web which requires treatment in a machine (e.g., a calender) employing such pressure rolls. The roll 1 comprises a hollow cylindrical shell 3 which is traversed by a stationary carrier (hereinafter called beam) 4. The end portions of this beam are mounted in spherical bearings 5 which, in turn, are mounted in the frame 6 or another suitable stationary support of the machine. The bearings 5 permit the respective end portions of the beam 4 to pivot about axes which are disposed in a plane extending at right angles to the plane of FIG. 1 but such bearings prevent the beam from rotating in the frame 6.

The beam 4 carries two rows of discrete hydrostatic supporting elements 8 and 9. Each of these rows is parallel to the axis of the beam 4 and each such row preferably consists of the same number of identical supporting elements. The supporting elements 8 and 9 form several groups 7 each of which includes a supporting element 8 and a supporting element 9. The groups 7 are adjacent to each other, as considered in the axial direction of the shell 3, and the supporting elements 8, 9 of each group are spaced apart from one another, as considered in the circumferential direction of the shell. Each supporting element comprises a vertically reciprocable cylinder 15 having two cylinder chambers 16 for a pair of pistons 14 which are anchored in the beam 4. The pistons 14 of each supporting element 8 and the corresponding halves of the respective cylinders 15 constitute pairs of cooperating pressure transmitting units 10, 11 which ensure that the respective portion of the shell 3 is held against flexing or that it is flexed in a predictable manner in order to ensure that the width of the nip 40 remains unchanged, i.e., that a web which passes through this nip is compressed uniformly all the way from the one to the other of its marginal portions. The cylinders 15 of the supporting elements 8 and 9 can be said to constitute bearing members whose upper sides respectively undersides are in contact with or are closely adjacent to the internal surface 3a of the shell 3 when the latter is rotated, either by a prime mover or as a result of lengthwise transport of a web through the nip 40. The cylinder chambers 16 communicate with the longitudinally extending channels 18 of the beam 4 by way of radially extending channels 17 each of which is machined in part into the beam 4 and in part into the corresponding piston 14. The longitudinally extending channels 18 are connected with a pressure regulator 19 which controls the flow of hydraulic fluid into and from the respective cylinder chambers 16. To this end, the pressure regulator 19 cooperates with a pump 19a which draws hydraulic fluid from a tank 19b or another suitable source. The return line which allows hydraulic fluid to flow from the pressure regulator 19 back into the tank 19b is not shown in the drawing. The pressure regulator 19 may be of the type disclosed in U.S. Pat. No. Re. 29183/3.83 (Mannesmann Rexroth).

Each cylinder 15 defines two flow restricting passages or ports 20 which establish communication between the respective cylinder chambers 16 and hydrostatic lubricating recesses 21 which are machined into the convex outer side of the respective cylinder and are filled with pressurized hydraulic fluid to thus eliminate any direct contact between the material of the cylinder 15 and the internal surface 3a of the shell 3 or to reduce such contact to a minimum.

The construction of the lower hydrostatic supporting elements 9 is analogous to that of the elements 8; in the embodiment of FIGS. 1 to 3, each element 9 is a mirror image of the element 8 in the respective group 7 in the interior of the shell 3. The pressure transmitting units which are formed by the cylinder 15 of each lower hydrostatic supporting element 9 and the respective pistons 14 are denoted by the characters 12 and 13.

The pressure roll 1 of FIG. 1 to 3 further comprises two bearing units 22 (only one shown), one at each axial end of the shell 3. Each of the bearing units 22 comprises an annular outer bearing element 23 which is constituted by the respective end portion of the shell 3 and a sleeve-like annular inner bearing element 24 which is spacedly surrounded by the respective outer bearing element 23. The bearing elements 23 and 24 provide room for insertion of at least one antifriction roller bearing 25. The races of the bearing 25 which is shown in FIG. 1 are held against axial movement by split rings 26 which are recessed into grooves machined into the internal surface 3a of the shell 3, by an external shoulder 24a of the inner bearing element 24, and by a further split ring 26a which is recessed into a circumferential groove of the bearing element 24. In other words, each of the bearings 25 can be said to constitute a thrust bearing. The outer side of the bearing 25 is adjacent to a ring-shaped seal 27 which is installed between the bearing elements 23 and 24. A plate-like sealing washer 29 is adjacent to the outer end face of the inner sealing element 24, and this washer cooperates with the outer end face of the bearing element 24 to compress an O-ring 28. The sealing washer 29 is held against axial movement away from the inner sealing element 24 by a split ring 31 which is recessed into a circumferential groove of a smaller-diameter stub 36 forming part of the respective end portion of the beam 4 and extending into the spherical bearing 5. The washer 29 cannot rotate with reference to the stub 36. The inner end face of the inner bearing element 24 abuts against a shoulder 30 of the beam 4 so that the bearing element 24 is held against axial movement with reference to the shell 3.

The internal surface of the inner bearing element 24 and the external surface of the respective portion of the beam 4 define a radial clearance or gap 32 which enables the bearing unit 22 including the outer bearing element 23 (i.e., the respective end portion of the shell 3) to move radially of the stub 36. When the outer bearing element 23 assumes its lowermost position, the inner bearing element 24 (which is compelled to share all radial movements of the outer bearing element 23 in view of the provision of the roller bearing 25 therebetween) abuts against the topmost portion of the respective part of the beam 4, i.e., the width of the uppermost portion of the gap 32 is then reduced to zero. Such situation will arise if the cylinder chambers 16 of the upper cylinders 15 forming part of the supporting elements 8 are permitted to discharge the hydraulic fluid into the tank 19b or when the pressure in the cylinder chambers 16 of the lower supporting elements 9 prevails so that the shell 3 is caused to move downwardly and away from the external surface of the adjacent pressure roll 2.

The roll 1 further comprises means for monitoring the positions of the end portions 23 of the shell 3 with reference to the beam 4, i.e., with reference to the cooperating pressure roll 2. The monitoring means for the illustrated end portion 23 comprises three signal generating sensors 33, 34 and 35. The purpose of these sensors is to ascertain the position of the respective inner bearing element 24 with reference to the corresponding stub 36 of the beam 4. The sensor 35 detects the deviations $\Delta y$ in the direction of the supporting plane 37 including the axes of the shell 3 and pressure roll 2. The sensor 33 detects radial deviations $\Delta x_1$ in a direction at right angles to and to the right of the plane 37, as viewed in FIG. 3, and the sensor 34 detects radial deviations $\Delta x_2$ in a direction at right angles to and to the left of the plane 37, again as seen in FIG. 3. Each of the sensors 33, 34, 35 can constitute any one of a wide variety of well-known and commercially available mechanical, electrical, optical, pneumatic, hydraulic and/or other position sensing devices, e.g., a proximity detector wherein a reciprocable member causes a transducer to generate signals whose intensity or another characteristic is indicative of the magnitude of the respective radial deviation ($\Delta y$, $\Delta x_1$ or $\Delta x_2$) of the bearing element 24 from its normal position. Another type of position sensing devices which can be used with advantage are induction coils whose cores move to the extent which is a function of the deviation of the inner bearing element 24 from its normal or neutral position relative to the beam 4.

The signals which are generated by the sensors 33, 34, 35 are transmitted to the corresponding inputs of an evaluating circuit 38, preferably a suitable computer, which influences the regulating unit 19. The computer 38 has additional inputs 39 for reception of other types of signals, e.g., of signals denoting the magnitude of forces acting between longitudinally spaced-apart portions of the shell 3 and the neighboring portions of the external surface of the roll 2. Such signals are transmitted by additional sensors which monitor the pressures and/or forces between the aforementioned longitudinally spaced portions of the shell 3 and and pressure roll 2. Alternatively, or in addition to the just discussed signals, the inputs 39 of the computer 38 can receive signals denoting the characteristics of spaced-apart portions of the web of textile or other material which is caused to advance through the nip 40 of the shell 3 and pressure roll 2. Still further, the inputs 39 can receive reference signals denoting the desired or optimum pressures between selected portions of the peripheral surface of the shell 3 and the adjoining portions of the peripheral surface of the pressure roll 2. Moreover, the inputs 39 can receive signals each of which is indicative of two or more different parameters. The computer 38 processes all incoming signals and transmits corresponding signals which influence the pressure regulator 19 to thus ensure that the pressure in the cylinder chambers 16 of the supporting elements 8 and 9 is best suited to guarantee that the shell 3 is not flexed at all or that it is flexed in accordance with a desired pattern in order to ensure an optimum treatment of the web which advances through the nip 40. For example, the signals at the outputs of the computer 38 can be a function of incoming signals denoting the deviations $\Delta y$, $\Delta x_1$ and $\Delta x_2$ as well as of the temperatures prevailing in longitudinally spaced-apart portions of the roll 3. Such incoming signals are compared with preselected reference values or with a predetermined program, and the signals at the outputs of the computer 38 are indicative of deviations (if any) from the preselected reference values or from the predetermined program. The purpose of the computer 38 and pressure regulator 19 is to ensure prompt and accurate regulation or change of fluid pressure in some or all of the cylinder chambers 16 so as to guarantee that the web which passes through the nip 40 is subjected to requisite pressure in each and every portion thereof (as considered in the axial direction of the shell 3 and pressure roll 2). In other words, the computer 38 influences the pressure regulator 19 to ensure that the shell 3 exhibits an optimum external shape in the supporting plane 37 as well as in a plane (X) which is normal to the plane 37. Moreover, the computer 38 influences the pressure regulator 19 to ensure that the end portions 23 of the shell 3 are held in optimum positions (as considered at right angles to the plane 37) in spite of the presence of more or less pronounced external transverse forces which have components acting at right angles to the plane 37 and tending to shift the end portions 23 in the plane X (to the left or to the right of the plane 37, as viewed in FIG. 3). Such components of external forces are neutralized by those components of internal forces generated by some or all of the pressure transmitting units 10–13 which act at right angles to the plane 37.

In order to generate forces having components in the plane X, the pressures in the left-hand chambers 16 (as viewed in FIG. 2) must deviate from the pressures in the right-hand chambers 16. In order to establish proper relationship between forces acting in the plane X and those acting in the plane 37, it is necessary to raise the pressure in the upper cylinder chambers 16 (as viewed in FIG. 2) above the pressure in the lower cylinder chambers 16, or vice versa. It is not always necessary to regulate the pressure in each and every cylinder chamber 16 independently of each other cylinder chamber 16. For example, such cylinder chambers can be arrayed to form a desired number of sets and the pressure regulator 19 is then designed to regulate the pressure of hydraulic fluid in each set of cylinder chambers 16 independently of or jointly with the pressure of fluid in the other set or sets. For example, the cylinder chambers 16 of neighboring groups 7 of supporting elements 8 and/or 9 can be assembled into sets of eight chambers each so that the number of such sets equals one-fourth or another fraction of the total number of supporting elements 8 or 9. Such arraying of cylinder chambers 16 contributes to simplification of the improved pressure roll and to pronounced simplification of controls including the pressure regulator 19 and the computer 38. Thus, the number of channels connecting the cylinder chambers 16 with the regulating unit 19 can be reduced drastically if each set comprises a substantial number of cylinder chambers.

It is further within the purview of the invention to provide one or more additional rows of supporting elements, for example, two rows of elements 8 at the upper side and/or two rows of elements 9 at the underside of the beam 4. Still further, each of the supporting elements 8 and/or 9 can be provided with three or more cylinder chambers 16 and with a correspondingly increased number of pistons. Reference may be had, for example, to the aforementioned commonly owned U.S. Pat. No. 4,328,744 to Pav et al. The disclosure of this patent is incorporated herein by reference.

The shell 3 of the improved pressure roll 1 is mounted exclusively on the hydrostatic supporting elements 8 and 9, i.e., there is no need for radial bearings between the end portions 23 of the shell 3 and the respective end portions of the beam 4. The supporting and stabilizing forces which are required for the generation of pressure upon the web and/or for stabilization of the position of the shell 3 are furnished exclusively by the pressure transmitting units 10, 11, 12 and 13. The operation of these pressure transmitting units can be regulated (by the pressure regulator 19 in combination with the computer 38) with a very high degree of accuracy and reproducibility. This prevents (for all practical purposes) the development of torsional and/or other undesirable stresses in, on or in the region of, the end portions 23 of the shell 3. The end portions 23 are held in their optimum (centered) positions by appropriate compensation for the development of forces which cause excessive displacements $\Delta y$, $\Delta x_1$ and/or $\Delta x_2$. Rotation of the inner bearing elements 24 is prevented as a result of minute or relatively small friction which develops between the O-rings 28 and the respective washers 29. It will be recalled that each washer 29 is held against rotation relative to the respective stub 36 and the O-rings 28 are recessed into endless grooves in the respective end faces of the adjacent inner bearing elements 24. Of course, it is equally possible to recess the O-rings 28 into the respective washers 29 or to recess each O-ring partly in the respective washer 29 and partly in the respective inner bearing element 24. Therefore, shifting of the axis of the shell 3 in the supporting plane 37 takes place practically without any hindrance. The materials of the inner bearing elements 24 and of the washer-like sealing members 29 need not exhibit any characteristics which are expected from friction bearings.

When the shell 3 of the pressure roll 1 is moved toward the pressure roll 2 and/or vice versa, the position of the shell 3 with reference to the roll 2 can be determined with a very high degree of accuracy by resort to well known sensors which monitor the distance between the peripheral surfaces of the shell 3 and roll 2 and/or the presence or absence of parallelism between the axis of the roll 2 and the axis of the shell 3. Such sensors can be activated while the shell 3 moves relative to the roll 2 and/or vice versa for the purpose of reducing the width of the nip 40 to a preselected optimum value preparatory to a particular treatment of a running web or sheet of paper, textile material or the like.

An important advantage of the pressure roll 1 of FIGS. 1 to 3 is that the inner bearing elements 24 of the bearing units 22 and the respective stubs 36 of the beam 4 define circumferentially complete annular clearances or gaps 32 when the shell 3 is centered with respect to the beam. In other words, the pressure roll 1 does not have any mechanical means for preventing the end portions 23 of the shell 3 from moving radially of the beam in directions at right angles to the supporting plane 37. This is in contrast to the disclosure of the aforementioned U.S. Pat. No. 3,885,283 to Biondetti wherein the end portions of the shell are confined to radial movements in the supporting plane by continuously abutting surfaces, pins and/or studs and wherein a single row of supporting elements merely effects radial movements of the pressure roll in the supporting plane. The provision of mechanical guide means which prevent radial movements of the end portions of the shell in the pressure roll of Biondetti results in the generation of pronounced friction, for example, when the axis of the shell of the pressure roll is caused to move in the supporting plane (toward or away from the companion pressure roll) but the shell is simultaneously acted upon by forces which tend to move its end portions at right angles to the supporting plane. The establishment of pronounced friction between the end portions of the shell in the patented pressure roll and the beam prevents accurate adjustments of pressure between the external surface of the shell and the external surface of the companion roll because the magnitude of friction varies unpredictably within a very wide range. In addition, each inner bearing element (called guide ring) in the pressure roll of Biondetti is urged to share the angular movements of the shell with a very pronounced force due to the absence of roller bearings or other types of bearings between such guide ring and the respective end portion of the shell. This also contributes to the development of unpredictable forces (especially forces which arise as a result of non-uniform pressure between the internal surfaces of the end portions of the shell and the respective guide rings of Biondetti) and the beam of the patented roll tends to hold the shell against rotation with a pronounced force. All this prevents accurate regulation of the pressure between the external surface of the shell of the patented pressure roll and the external surface of the companion roll. Moreover, the wear upon the abutting surfaces of parts which move relative to each other is very pronounced and the end portions of the shell are subjected to substantial torsional and other undesirable stresses.

In accordance with the present invention, and as shown in FIGS. 1 to 3, the end portions 23 of the shell 3 are held out of contact with the adjacent portions (stubs 36) of the beam 4 by the simple expedient of properly distributing the pressure transmitting units 10 to 13 in the axial as well as in the circumferential direction of the shell 3 so that the regulation of pressure in the chambers 16 of such units can entail a highly accurate retention of the end portions 23 in optimum positions with reference to the respective stubs 36 without resorting to mechanical means for confining the end portions 23 to radial movements in the supporting plane 37. The sensors 33, 34 and 35 at each axial end of the shell 3 transmit signals denoting the extent of deviations $\Delta y$, $\Delta x_1$ and $\Delta x_2$, i.e., the magnitude of those internal forces which must be furnished by the pressure transmitting units 10–13 in order to ensure that the components of such forces acting at right angles to the plane 37 will at least substantially neutralize or balance the components of external forces acting upon the end portions 23 of the shell 3 at right angles to the supporting plane 37. Of course, the pressure regulator 19 further ensures that the median portion of the shell 3 is also maintained in an optimum position with reference to the adjoining pressure roll 2 so that the pressure along the full width of a running web, which passes through the nip 40, matches the desirable optimum pressure. Since the end portions 23 of the shell 3 are always out of contact with the respective stubs 36 of the beam 4, and the inner bearing elements 24 are normally out of contact with the respective stubs, the magnitude of radially acting forces which are transmitted from the end portions 23 to the beam 4 is normally zero so that the end portions of the shell 3 are not subjected to any torsional or like stresses which are bound to develop in conventional pressure rolls wherein the end portions of the shell are mechanically held against radial movements other than those in the supporting plane. The absence of any form-locking connection between the end portions 23 of the shell 3 and the respective stubs 36 has been found to contribute significantly to the facility of accurately selecting and maintaining the positions of such end portions with reference to the beam 4 as well as with reference to the pressure roll 2. This is attributable, to a considerable extent, to the absence of any friction between the end portions 23 and the respective stubs 36, i.e., to the establishment and maintenance of a circumferentially complete annular gap or clearance 32 between each inner bearing element 24 and the beam 4. The exact magnitude of randomly developing and disappearing frictional forces (which develop in conventional pressure rolls) cannot be ascertained with such degree of accuracy as is desirable and necessary in pressure rolls of the type intended for use in calenders and analogous machines for precision treatment of running webs or sheets of paper, textile material, metallic sheet stock or the like.

The groups 7 of hydrostatic supporting elements 8 and 9 are capable of generating forces which are amply sufficient to maintain each and every portion of the shell 3 in an optimum position with reference to the beam 4 and pressure roll 2. It has been found that the illustrated distribution of supporting elements 8 and 9, as considered in the axial as well as in the circumferential direction of the shell 3, renders it possible to generate adequate internal forces having components acting at right angles to the plane 37 without the generation of excessive radial forces which act in the supporting plane.

The absence of any mechanical guide means between the inner bearing elements 24 of the bearing units 22 and the beam 4 contributes to a pronounced reduction of wear upon such parts and to longer useful life of the improved pressure roll. This is in contrast to the heretofore known pressure rolls, especially rolls which employ means for compensating for or for eliminating the flexing of the shell. The shell 3 of the improved pressure roll 1 can be caused to conform its shape to that of the companion pressure roll 2 with a heretofore unmatched degree of accuracy and predictability and ensures the establishment of optimum pressures between the external surface of the shell 3 and the external surface of the roll 2 (or between the external surface of the shell and the respective side of a web in the nip 40) all the way from one to the other axial end of the shell. This renders it possible to accurately select the nature and extent of treatment to which a web is to be subjected in the nip 40, i.e., to accurately determine the thickness and/or other characteristics of successive increments of the web which advance beyond the nip. Such superior results are achievable due to the discovery that the end portions 23 of the shell 3 need not be mechanically held against movement at right angles to the supporting plane 37, i.e., that it suffices to properly distribute the supporting elements 8 and 9 and to provide an adequate number of such supporting elements so that the configuration and position of the entire shell 3, inclusive of its end portions 23, can be selected and maintained by the sole expedient of properly influencing the pressure regulator 19 which controls the pressure in the cylinder chambers 16.

The absence of any mechanical guide means between the inner bearing elements 24 and the respective stubs 36 of the beam 4 renders it possible to greatly reduce the thickness of the shell 3 without risking unpredictable deformation. The thickness of the shell 3 can be reduced by between 20 and 50 percent in comparison with the shells of heretofore known pressure rolls serving similar purposes. A pronounced reduction of the wall thickness of the shell still further enhances the ability of the pressure regulator 19 to accurately select the pressure between the shell 3 and the roll 2 because the configuration of a relatively thin shell can even more accurately conform to the shape of the adjacent portion of the roll 2. It has been found that the regulation is even more accurate and predictable if the shell 3 has an elastic outer layer (such as the outer layer 68 of the shell 3 shown in FIG. 13); this renders it possible to regulate the deformation of the outer layer and hence the temperature of such outer layer all the way between the two axial ends of such shell. The pressure regulator 19 (in cooperation with the pressure transmitting units 10 to 13 of the supporting elements 8 and 9) allows for retention of the axis of the shell 3 in the supporting plane 37 during movement of the shell toward or away from the pressure roll 2 as well as to prevent tilting of the axis of the shell 3 relative to the axis of the roll 2 in the plane 37. This is of considerable importance during closing of the gap between the external surface of the shell 3 and the external surface of the roll 2, i.e., during establishment of a nip 40 which ensures predictable treatment of the conveyed material.

Figure 14:
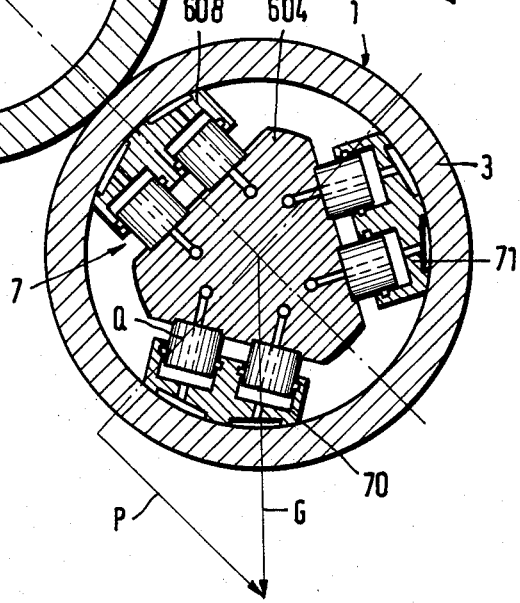
FIG. 14 is a similar transverse vertical sectional view but showing a roll which embodies the present invention and employs three rows of supporting elements.

In the embodiment of FIGS. 1 to 3, the supporting plane 37 halves each of the supporting elements 8 and 9, i.e., the pressure transmitting units 10 and 12 are mirror symmetrical to the pressure transmitting units 11, 13 with reference to the supporting plane 37. This is desirable and advantageous in machines wherein the pressure roll 1 must rotate in a clockwise or in a counter-clockwise direction. If the distribution of forces should be non-symmetrical (with reference to the plane 37), this can be readily achieved by appropriate regulation of the flow of pressurized hydraulic fluid into and from selected cylinders 16 of the supporting elements 8 and/or 9. The placing of supporting elements 8 and 9 of each group 7 diametrically opposite each other with reference to the axis of the beam 4 and shell 3 is one of the presently preferred distributions of such supporting elements. Of course, the magnitude of forces having components acting at right angles to the plane 37 can be increased by increasing the number of supporting elements in each group to three or more without the need to employ larger pressure transmitting units. As can be seen in FIGS. 14 and 15, the presently preferred distribution of supporting elements in each group which comprises three supporting elements is to place one of the supporting elements between the beam and the companion pressure roll and to place the other two supporting elements at the opposite sides of the supporting plane so that the other two supporting elements are mirror symmetrical to each other with reference to such plane.

The utilization of relatively short supporting elements, i.e., of elements whose length (as considered in the axial direction of the shell 3) is less than their width (as considered in the circumferential direction of the shell), is often desirable and advantageous because this renders it possible to accommodate a substantial number of groups 7 in the space between the two axial ends of the shell. The groups 7 can be placed close or immediately next to each other; this not only enables the supporting elements 8 and 9 to apply to the shell 3 more pronounced forces but such supporting elements are also capable of individually determining the pressures acting upon small or very small portions of the internal surface 3a of the shell so that the configuration of the shell (especially a relatively thin-walled shell) can be selected and maintained with an even higher degree of accuracy.

Figure 5:
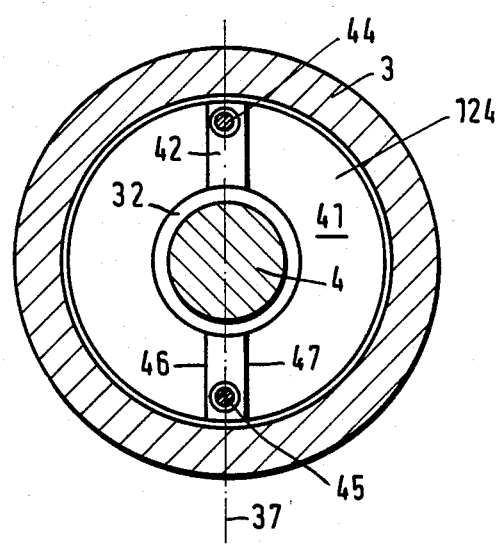
FIG. 5 is a transverse vertical sectional view of the second roll as seen in the direction of arrows from the line C—C of FIG. 4.

FIGS. 4 and 5 illustrate a portion of a modified pressure roll 1 which cooperates with a second roll 2. The latter may but need not be identical with the roll 1 of FIGS. 4–5 or with the roll 1 of FIGS. 1–3. All such parts of the roll 1 of FIGS. 4–5 which are clearly identical with the corresponding parts of the roll 1 of FIGS. 1–3 are denoted by identical reference characters, and all parts of the roll 1 of FIGS. 4–5 which are similar or analogous to the corresponding parts of the roll 1 of FIGS. 1–3 are denoted by similar reference characters plus 100. The annular inner bearing element 124 of the illustrated bearing unit 22 has an end face 41 which faces the neighboring outermost supporting elements 8 and 9 (first group 7) and is formed with a diametrically extending groove 42 which also extends into a flange 43 of the bearing element 124. The flange 43 extends radially outwardly between the roller bearing 25 and the nearest hydrostatic supporting elements 8, 9 toward and close to the internal surface 3a of the shell 3. The groove 42 receives a first arresting means in the form of two projections constituting rotary elements 44, 45 which are disposed at the opposite sides of the beam 4 and constitute rollers mounted on axially parallel shafts secured to a collar or holder 48 of the beam 4. The groove 42 is flanked by two parallel guide faces 46, 47 constituting a second arresting means, and the distance between such guide faces slightly exceeds the diameters of the rotary elements 44, 45 (see FIG. 5). The guide faces 46 and 47 are parallel to the supporting plane 37, i.e., to the plane which includes the axes of the shell 3 and roll 2. The plane 37 extends through the nip 40 between the peripheral surfaces of the shell 3 and pressure roll 2. The collar 48 can be replaced with a diametrically extending strip-shaped portion of the beam 4.

The shell 3 is free to move its axis in the supporting plane 37 to the extent which is determined by the dimensions of the annular gap 32 between the beam 4 and the inner bearing element 124. The extent of movement of the shell 3 at right angles to the supporting plane 37 is determined by the play between the rotary elements 44, 45 on the one hand and the guide faces 46, 47 on the other hand. The extent of such transverse movement (at right angles to the supporting plane 37) can be increased by providing the beam 4 with an elastically deformable collar 48 for the rotary elements 44, 45. These rotary elements prevent rotation of the inner bearing element 124 with reference to the beam 4. Since the force with which the rotary elements 44, 45 bear against the guide faces 46 and/or 47 is small or very small, and since the friction between the peripheral surfaces of the elements 44, 45 and the guide faces 46, 47 is negligible, the axis of the shell 3 can be shifted in the supporting plane 37 toward or away from the axis of the pressure roll 2 practically without any resistance.

An advantage of the roll 1 which is shown in FIGS. 4 and 5 is that it positively prevents rotation of the inner bearing element 124 with the shell 3 at all times including the times when the speed of the shell changes. Since each inner bearing element 124 spacedly surrounds the respective stub 36 of the beam 4, the only forces which tend to rotate the bearing element 124 in response to rotation of the shell 3 are the forces which develop as a result of indirect contact between the inner bearing element 124 and the outer bearing element (end portion of the shell) 23 by way of the roller bearing 25 and/or any other parts which are in contact with such bearing elements. The first and second arresting means 44, 45 and 46, 47 of FIGS. 4 and 5 positively prevent any rotation of the inner bearing element 124 with the respective outer bearing element 23 in that the peripheral surfaces of the rotary elements 44, 45 which constitute the first arresting means abut against the adjacent guide faces 46 or 47 of the inner bearing element 124 and thus ensure that the angular movement of the inner bearing element 124 is limited to the relatively small play with which the rotary elements 44, 45 are received in the diametrically extending groove 42 of the end face 41 of the element 124.

Prevention of rotation of the inner bearing element 124 relative to the beam 4 is advisable on the ground that the materials of such parts need not be selected with a view to stand pronounced and extended friction. Furthermore, the neighboring surfaces of the parts 4, 124 need not be machined with a view to ensure a reduction of friction, an increase of friction or the absence of excessive wear. Moreover, the arresting means 44, 45 and 46, 47 prolong the useful life of the sealing elements 28, 29 between the inner bearing elements 124 and the beam 4. In fact, the arresting means 44, 45 and 46, 47 can be said to constitute an optional feature of the roll 1 which is shown in FIGS. 4 and 5 because the compressed O-rings 28 between the washers 29 (which do not rotate relative to the beam 4) and the adjacent end faces of the respective inner bearing elements 124 can suffice to hold the elements 124 against rotation with the outer bearing elements 23 and relative to the beam 4 and frame or support 6. The arresting means 44 to 47 can be omitted when the tendency of the inner bearing elements 124 to rotate with the respective outer bearing elements 23 is small or negligible. Since the forces which the arresting means 44, 45 and 46, 47 transmit between the inner bearing elements 124 and the respective stubs 36 are small or very small, such forces do not entail appreciable twisting or other undesirable stressing of the end portions 23 of the shell 3. Also, the dimensions of the first arresting means 44, 45 can be small and the wear upon the guide faces 46, 47 is negligible, not only because the first arresting means consists of rotary elements (such as idler rollers) but also because the rotary elements are received in the respective grooves 42 with little play so that they offer negligible resistance or no resistance at all to radial movements of the end portions 23 of the shell 3 in directions which are parallel to the supporting plane 37. The establishment of minimal play between the guide faces 46, 47 and the rotary elements 44, 45 at each axial end of the shell 3 is desirable and advantageous on the additional ground that this facilitates the regulation of pressure in the cylinder chambers 16 via pressure regulator 19 because the supporting elements 8 and 9 need not overcome a pronounced resistance to displacement of the axis of the shell 3 in the supporting plane 37, i.e., if a resistance to such movement exists, it is not furnished by the arresting means 44–47 but rather by the companion pressure roll 2 and/or by the web of material passing through the nip 40. Still further, the presence of some play between the rotary elements 44, 45 on the one hand and the corresponding guide faces 46, 47 on the other hand simplifies the making as well as the assembling of the roll 1, i.e., the parts of the roll 1 need not be machined with utmost precision because the just mentioned play allows for proper assembly of the parts of the roll 1 even if the manufacturing tolerances are not within the range which would contribute excessively to the manufacturing cost of the roll. The extent of play between the rotary elements 44, 45 and the corresponding guide faces 46, 47 is selected with a view to ensure that it remains within the limits of deformability of the respective O-rings 28, i.e., that such O-rings are not destroyed or damaged or subjected to excessive stresses when the rotary elements 44, 45 move from abutment with the surfaces 46 or 47 into abutment with the surfaces 47 or 46, or vice versa. The same holds true for other deformable seals between the shell 3 and the beam 4.

The rotary elements 44, 45 can be replaced with other types of arresting means (e.g., with fixedly installed bolts or pins) without departing from the spirit of the invention. This does not adversely influence the operation of the pressure roll 1 because the magnitude of forces which are taken up by the arresting means between the inner bearing elements 124 and the beam 4 is small or very small. Thus, even if the arresting means do not comprise rotary elements, the friction is sufficiently small to render it highly unlikely that the forces acting between the bearing units 22 and the beam 4 would cause the application of pronounced torsional or other stresses to the end portions 23 of the shell 3 when the pressure roll 1 is in actual use. The provision of arresting means which include rotary elements is preferred at this time because such rotary elements eliminate the likelihood of generation of appreciable frictional forces which could adversely affect the accuracy of adjustment of the shell 3 with reference to the beam 4 and/or the pressure roll 2. Each rotary element of the arresting means can employ a shank which is anchored in the beam 4 or in the respective bearing element 124, a rotary portion which is mounted on the shank, and an antifriction bearing between the rotary portion and the shank. The peripheral surfaces of the rotary elements 44 and 45 can be flat or rounded. The provision of rounded peripheral surfaces reduces the area of contact between such surfaces and the guide faces 46, 47 with attendant increase of pressure per unit area. However, and since the magnitude of forces which are transmitted by the guide faces 46, 47 to the rotary elements 44, 45 and/or vice versa is relatively small, such concentration of stresses at the points of contact between the rotary elements 44, 45 and the guide faces 46, 47 does not present any problems.

The positions of the rotary elements 44, 45 and guide faces 46, 47 can be reversed, i.e., the rotary elements 44, 45 can be mounted on the inner bearing elements 124. The illustrated mode of mounting the rotary elements 44, 45 on the beam 4 is preferred at this time.

Instead of providing the end faces 41 of the inner bearing elements 124 with diametrically extending grooves 42, it is also possible to provide such end faces with ribs which have guide faces flanking the respective rotary elements 44, 45. The provision of grooves 42 is preferred at this time because the making of such grooves is less expensive and also because the provision of such grooves contributes to compactness of the arresting means since the rotary elements actually extend into the respective bearing elements 124, i.e., into cavities (grooves) which are obtained by removing material from the inner bearing elements.

The diametrically extending grooves 42 can be replaced with shorter (radial) grooves each of which receives a single rotary element 44 or 45. This does not present any problems because the magnitude of forces which are transmitted between the guide faces in the grooves and the rotary elements are small. With reference to FIG. 5, the lower half of the groove 42 and the corresponding rotary element 45 can be omitted. Such simplified arresting means can still oppose rotation of the respective inner bearing element 124 in either direction.

It is preferred to place the rotary element or elements of the arresting means nearer to the internal surface of the shell 3 than to the beam 4. In other words, it is advisable to place the rotary element or elements at a considerable radial distance from the axis of the shell; this entails a reduction of the forces which must be transmitted by such rotary element or elements for a given torque when the arresting means is in use.

Figure 6:
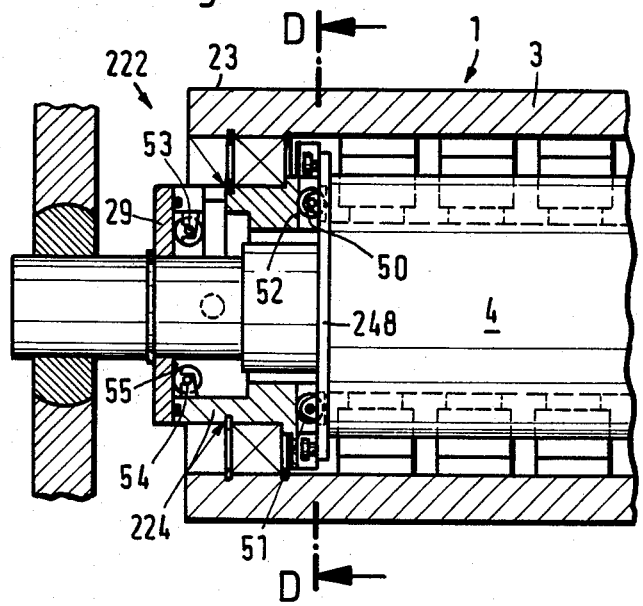
FIG. 6 is a fragmentary axial sectional view of a third pressure roll.
Figure 7:
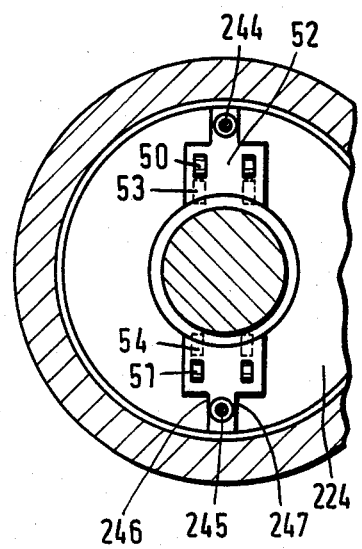
FIG. 7 is a transverse vertical sectional view as seen in the direction of arrows from the line D—D of FIG. 6.

In the embodiment of FIGS. 6 and 7, all such parts which are identical with those of the embodiment of FIGS. 1-3 are denoted by identical reference characters and all such parts which are similar or analogous to those of the roll 1 shown in FIGS. 1-3 are denoted by similar reference characters plus 200. The holder or collar 248 of the beam 4 carries pairs of rotary elements 50 and 51 which can engage an end face 52 of the inner bearing element 224. The inner bearing element 224 is further provided with pairs of rotary elements 53 and 54 which can engage an end face 55 of the washer-like sealing member 29. Thus, the shell 3 is capable of transmitting more pronounced axial forces to the beam 4 without risking the development of unpredictable frictional forces during radial movement of the shell 3 in the supporting plane.

The positions of the rotary elements 50, 51 and the end face 52 can be reversed, i.e., the rotary elements 50, 51 can be mounted on the inner bearing element 224 and an equivalent of the end face 52 can be provided on the beam 4. Analogously, the rotary elements 53, 54 can be mounted on the washer 29 to engage an adjoining end face of the inner bearing element 224. The provision of rotary elements (50, 51, 53 and 54) in the path of transmission of axial stresses from the end portion 23 of the shell 3 to the beam 4 is especially desirable and advantageous when the axial stresses are pronounced so that they tend to rotate the inner bearing element 224 with the end portion 23 (i.e., with the outer bearing element of the bearing unit 222).

Figure 8:
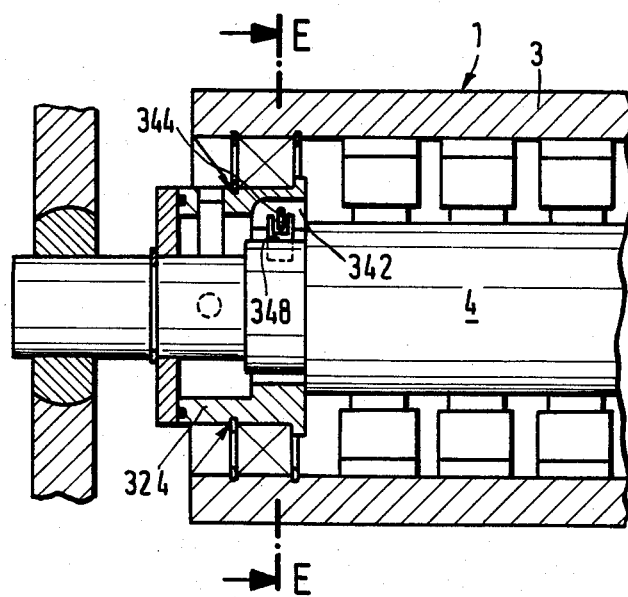
FIG. 8 is a fragmentary axial sectional view of a fourth pressure roll.
Figure 9:
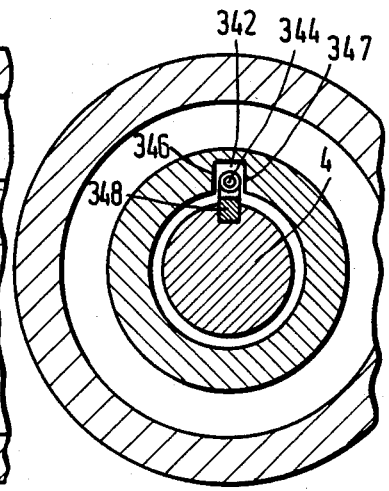
FIG. 9 is a transverse vertical sectional view as seen in the direction of arrows from the line E—E of FIG. 8.

FIGS. 8 and 9 illustrate a further embodiment wherein all such parts which are identical with those of the pressure roll 1 shown in FIGS. 1 to 3 are denoted by the same reference characters and all such parts which are similar or analogous to the parts of the roll 1 of FIGS. 1 to 3 are denoted by similar reference characters plus 300. The roll 1 of FIGS. 8 and 9 comprises a rotary element 344 which is disposed at the upper side of the beam 4 and is received with clearance between the end faces 346 and 347 in a groove 342 machined into the inner bearing element 324. The rotary element 344 is mounted on a bifurcated holder 348 which is secured to or forms part of the beam 4.

Figure 10:
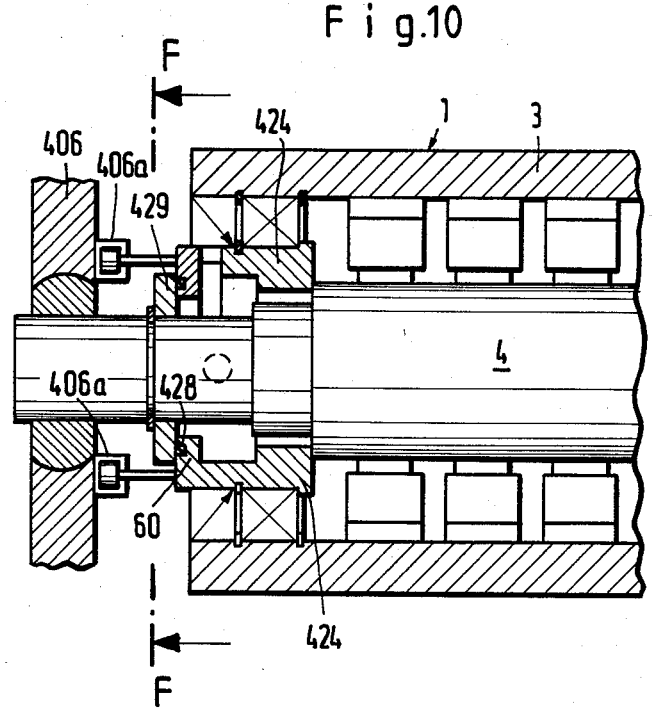
FIG. 10 is a fragmentary axial sectional view of a fifth pressure roll.
Figure 11:
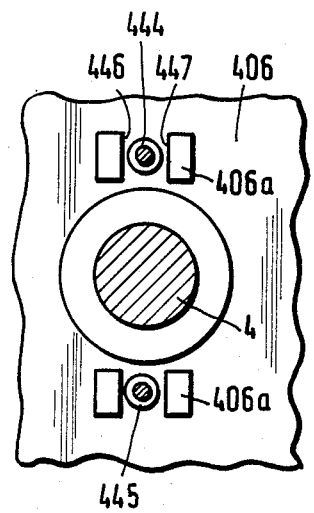
FIG. 11 is a transverse vertical sectional view as seen in the direction of arrows from the line F—F of FIG. 10.

FIGS. 10 and 11 illustrate a further pressure roll 1 wherein all such parts which are identical with those of the roll 1 of FIGS. 1-3 are denoted by the same reference characters. All such parts of the roll 1 of FIGS. 10-11 which are similar or analogous to the corresponding parts of the roll of FIGS. 1 to 3 are denoted by similar reference characters plus 400. The roll 1 of FIGS. 10 and 11 comprises two rotary elements 444, 445 which are disposed at the opposite sides of the beam 4 and are mounted on the inner bearing element 424. Such rotary elements are received with clearance between pairs of guide faces 446, 447 which are provided on the frame 406 of the machine, e.g., a calender for the treatment of webs or sheets of textile material or paper. The diameter of the washer-like sealing member 429 is less than the diameter of the inner bearing element 424, and the O-ring 428 is recessed into a circumferentially complete groove in the front end face of a radially inwardly extending annular collar 60 of the inner bearing element 424.

The guide faces 446, 447 are the internal surfaces of pairs of substantially block-shaped projections 406a at the inner side of the frame 406. Each such pair of projections 406a can be said to define a groove for the respective rotary element 444 or 445.

Figure 12:
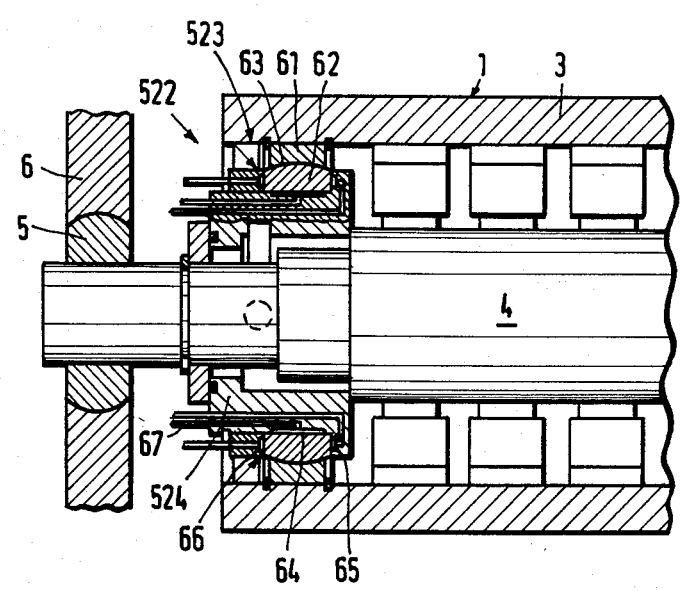
FIG. 12 is a fragmentary axial sectional view of a sixth pressure roll.

Referring to FIG. 12, there is shown an additional pressure roll 1 wherein all such parts which are identical with those of the roll 1 of FIGS. 1–3 are denoted by the same reference characters and all parts which are similar or analogous to the corresponding parts of the roll 1 of FIGS. 1–3 are denoted by similar reference characters plus 500. The bearing unit 522 does not comprise any means for holding the inner bearing element 524 against rotation with reference to the beam 4. The illustrated end portion 523 of the shell 3 surrounds two ring-shaped bearing components 61 and 62 one of which has a convex surface 63 abutting against a complementary concave surface of the other component. In the embodiment of FIG. 12, the convex surface 63 is provided on the inner bearing component 62. The components 61 and 62 can be said to form a universal joint or a spherical joint. The inner bearing element 524 has a hydrostatic lubricating recess 64 which is adjacent to the internal surface of the component 62. The components 61 and 62 can be said to constitute the constituents of the respective end portion 523 of the shell 3. The component 62 is flanked by end faces 65 and 66 which also comprise hydrostatic recesses (not specifically shown) and receive pressurized hydraulic fluid via conduits 67 to reduce friction between the parts which rotate with the shell 3 and the stationary parts on the beam 4.

It will be noted that the spherical joint or bearing including the components 61, 62 is provided in addition to the spherical bearing 5 for the respective end portion of the beam 4. The spherical joint including the components 61, 62 ensures that the orientation of the inner bearing element 524 relative to the respective end portion of the beam 4 remains unchanged while the orientation of the axis of the shell 3 with reference to the axis of the beam 4 is altered by the supporting elements 8 and/or 9. In addition to or in lieu of the hydrostatic bearing recess 64 between the inner annular component 62 and the inner bearing element 524, the pressure roll 1 of FIG. 12 can be provided with a hydrostatic lubricating recess between the components 61, 62. Such lubricating recesses contribute to a reduction of torque which the end portion 523 of the shell 3 tends to transmit to the bearing element 524.

The provision of hydrostatic lubricating recesses in the end faces 65 and 66 also contributes to a reduction of torque which the shell 3 tends to transmit to the parts that are or should be non-rotatably mounted on the beam 4.

Figure 13:
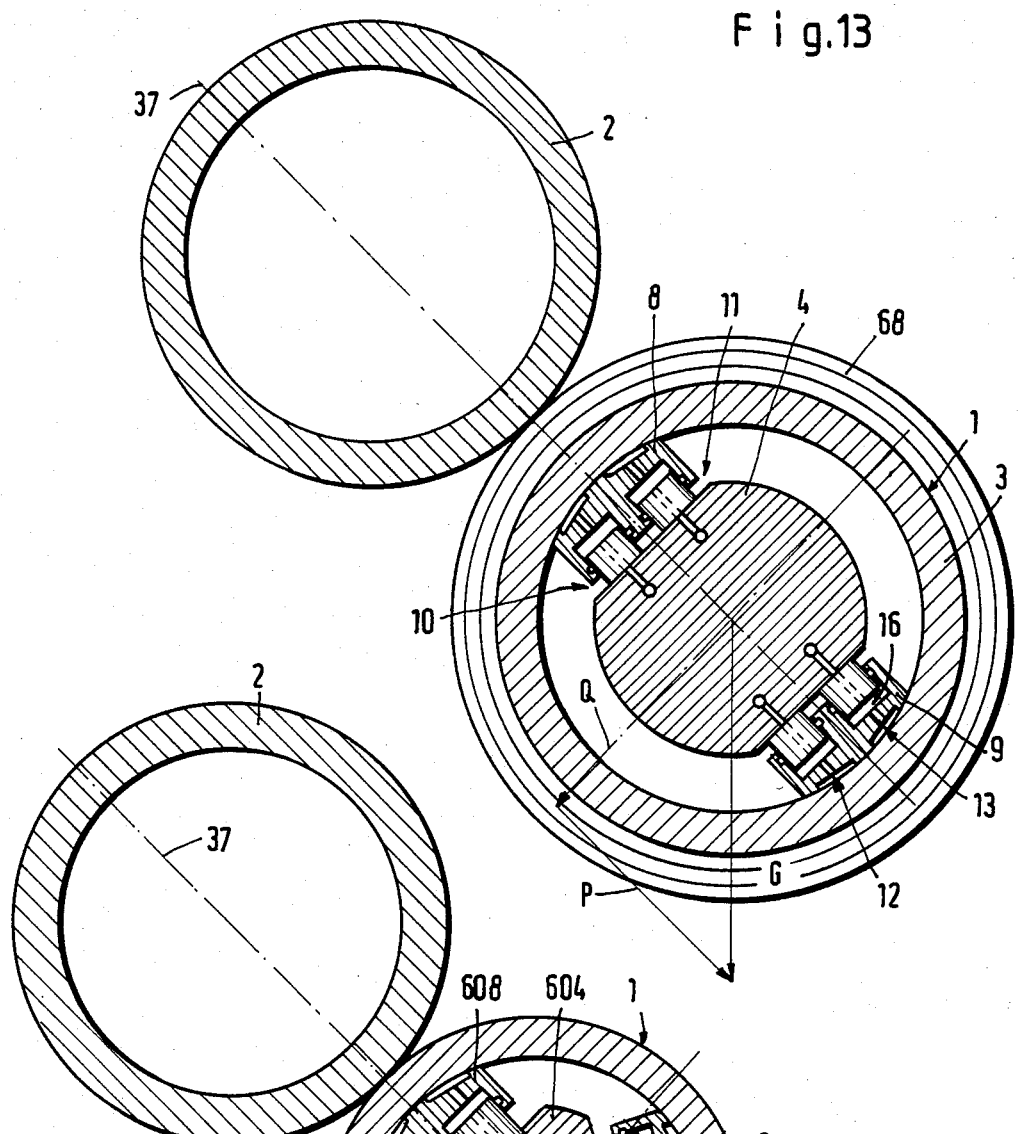
FIG. 13 is a transverse vertical sectional view of a pressure roll which is similar to the lower pressure roll of FIGS. 1 to 3 but cooperates with an adjoining pressure roll in a different way so that the axes of the two pressure rolls are disposed in a non-vertical supporting plane.

FIG. 13 shows that the supporting plane 37 need not be vertical, i.e., that the pressure roll 2 need not be disposed directly above or directly below the pressure roll 1. The shell 3 has an elastically deformable outer layer or stratum 68 which can consist of paper or the like. The weight G of the shell 3 constitutes the resultant of a composite force including a force P acting in parallelism with the supporting plane 37 and a force Q acting in a plane extending at right angles to the supporting plane 37. In this roll 1, the pressure in the pressure transmitting units 11 and 13 must exceed the pressure in the pressure transmitting units 10 and 12 in order to compensate for the component Q of the resultant force G. If additional transverse forces (Q) develop when the pressure roll 1 of FIG. 13 is in actual use, the pressure of hydraulic fluid in the chambers 16 of selected pressure transmitting units 10, 11, 12 and/or 13 is increased or reduced accordingly.

FIG. 14 illustrates a modification of the structure which is shown in FIG. 13. All such parts which are identical with those of the structure of FIG. 13 are denoted by the same reference characters and all such parts which are similar or analogous to the corresponding parts of the structure of FIG. 13 are denoted by similar reference characters plus 600. The beam 604 has a substantially triangular cross-sectional outline. Each section 7 in the shell 3 comprises three hydrostatic supporting elements 608, 70 and 71. The supporting elements 70 and 71 are disposed at the opposite sides of the supporting plane 37 and their function is to generate relatively large transverse forces +Q or −Q without necessarily generating pronounced forces in the supporting plane 37.

Referring finally to FIG. 15, there is shown a further pressure roll 1 which cooperates with two additional pressure rolls 2 and 602. The supporting plane which includes the axes of the rolls 1 and 2 is denoted by the reference character 37, and the supporting plane including the axes of the rolls 1 and 602 is denoted by the character 637. The supporting element 608 is halved by the supporting surface 37, and the supporting element 70 is halved by the supporting surface 637. The pressure regulator 619 is designed to regulate the pressure of hydraulic fluid in each of the supporting elements 608, 70, 71 as well as in the corresponding hydrostatic recesses 621. The regulator 619 can receive pressurized hydraulic fluid from a tank 619b or an analogous source by way of a pump 619a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a machine of the character indicated, particularly in a calender, the combination of first and second pressure rolls defining a nip and having axes normally disposed in a common supporting plane, at least one of said rolls comprising a stationary carrier; a hollow rotary cylindrical shell surrounding said carrier and having first and second end portions movable in said plane radially of the other of said rolls; groups of supporting elements installed in the interior of said shell and being spaced apart from one another, as considered in the axial direction of said shell, each of said groups including at least two supporting elements spaced apart from one another, as considered in the circumferential direction of said shell, and each of said supporting elements comprising a plurality of pressure transmitting units disposed next to each other, as considered in the circumferential direction of said shell, said shell being subject to the action of external forces having components acting at least upon the end portions of said shell substantially at right angles to said plane and said pressure transmitting units being operable to react against said carrier and transmit to said shell internal forces having components acting substantially at right angles to said plane; first and second bearing units each including an annular inner bearing element surrounded by the respective end portion of said shell, each inner bearing element being radially movably mounted on said carrier and said shell being rotatable with reference to said inner bearing elements, each of said bearing units further including an outer bearing element provided on and rotating with the respective end portion of said shell, said outer bearing elements being in indirect contact with and being rotatable relative to the respective inner bearing elements so that such inner bearing elements exhibit a tendency to rotate with said shell at least substantially exclusively as a result of indirect contact with the respective outer bearing elements; means for holding said inner bearing elements against rotation with said shell and including means for counteracting said tendency of said inner bearing elements, said counteracting means comprising stationary first arresting means and second arresting means cooperating with said first arresting means and provided on said inner bearing elements, said second arresting means being movable with minimal friction relative to said first arresting means in the radial direction of said other roll; and regulator means for operating said pressure transmitting units so as to effect to generation of internal forces whose components at least substantially neutralize the components of said external forces to thus maintain the axes of the end portions of said shell in said plane.

2. The combination of claim 1, wherein said carrier has first and second end portions and further comprising a stationary support for the end portions of said carrier, said first and second bearing units being movable with the respective end portions of said shell radially of said other roll and said inner bearing elements cooperating with the respective outer bearing elements to hold the respective end portions of said shell against axial movement with reference to said carrier.

3. The combination of claim 2, wherein each of said bearing units further comprises means for at least substantially sealing the interior of the respective end portion of said shell from the surrounding atmosphere.

4. The combination of claim 1, wherein the pressure transmitting units of at least one supporting element in each of said groups are at least substantially mirror symmetrical to one another with reference to said plane.

5. The combination of claim 1, wherein the supporting elements of each of said groups include pairs of supporting elements which are at least substantially mirror symmetrical to each other with reference to said plane.

6. The combination of claim 1, wherein each of said groups comprises a pair of supporting elements disposed at the opposite sides of said carrier.

7. The combination of claim 6, wherein said plane halves each of said supporting elements.

8. The combination of claim 1, wherein each of said groups comprises three supporting elements including a first element between said carrier and said other roll and two additional elements disposed at the opposite sides of said plane.

9. The combination of claim 8, wherein said additional supporting elements are mirror symmetrical to one another with reference to said plane.

10. The combination of claim 1, wherein the length of each of said supporting elements, as considered in the axial direction of said shell is less than the width of such supporting elements, as considered in the circumferential direction of said shell.

11. The combination of claim 1, wherein each inner bearing element is arranged to transmit axial stresses from the respective end portion of said shell to said carrier.

12. The combination of claim 1, wherein said second arresting means have limited freedom of angular movement with reference to said first arresting means.

13. The combination of claim 1, wherein said first arresting means comprises stationary projections and said second arresting means comprise pairs of guide faces provided on said inner bearing elements and flanking the respective projections.

14. The combination of claim 1, wherein one of said arresting means comprises rotary elements and the other of said arresting means has guide faces for said rotary elements.

15. The combination of claim 14, wherein said rotary elements comprise rollers.

16. The combination of claim 1, wherein said second arresting means comprises projections provided on said inner bearing elements and said first arresting means comprises guide faces provided on said carrier and engageable by the respective projections.

17. The combination of claim 1, wherein said first arresting means comprises projections provided on said carrier and said second arresting means comprises guide faces provided on said inner bearing elements and engageable with said projections when said inner bearing elements exhibit the tendency to rotate with said shell.

18. The combination of claim 1, wherein said first arresting means comprises a single arresting member for each of said bearing units.

19. The combination of claim 1, wherein one of said first and second arresting means has a pair of spaced apart guide faces for each of said bearing units and the other of said first and second arresting means has at least one projection extending with play between the respective pair of guide faces.

20. The combination of claim 1, wherein the outer bearing element of at least one of said bearing units being arranged to transmit axial stresses from said shell to the respective inner bearing element and further comprising means for transmitting axial stresses from the inner bearing element of said one bearing unit to said carrier.

21. The combination of claim 1, further comprising signal generating means for monitoring the positions of the end portions of said shell with reference to said carrier and means for influencing said regulator means as a function of signals denoting the monitored positions of said end portions.

22. The combination of claim 1, wherein said shell comprises an elastic outer layer.

23. The combination of claim 20, wherein said means for transmitting axial stresses comprises a first component provided on said carrier and a second component provided on the inner bearing element of said one bearing unit and arranged to move, with a mininum of friction, relative to said first component, in response to radial movement of the respective inner bearing element with reference to said carrier.

24. The combination of claim 21, wherein said monitoring means comprises a pair of sensors disposed at the opposite sides of said plane and arranged to monitor the extent of radial movement of one of said end portions at right angles to said plane.

25. The combination of claim 24, wherein said monitoring means comprises a third sensor arranged to monitor the extent of radial movement of said one end portion in said plane.

26. In a machine of the character indicated, particularly in a calender, the combination of first and second pressure rolls defining a nip and having axes normally disposed in a common supporting plane, at least one of said rolls comprising a stationary carrier; a hollow rotary cylindrical shell surrounding said carrier and having first and second end portions movable in said plane radially of the other of said rolls; groups of supporting elements installed in the interior of said shell and being spaced apart from one another, as considered in the axial direction of said shell, each of said groups including at least two supporting elements spaced apart from one another, as considered in the circumferential direction of said shell, and each of said supporting elements comprising a plurality of pressure transmitting units disposed next to each other, as considered in the circumferential direction of said shell, said shell being subject to the action of said external forces having components acting at least upon the end portions of said shell substantially at right angles to said plane and said pressure transmitting units being operable to react against said carrier and transmit to said shell internal forces having components acting substantially at right angles to said plane; first and second bearing units each including an annular inner bearing element surrounded by the respective end portion of said shell, each inner bearing element being radially movably mounted on said carrier and being arranged to transmit axial stresses from the respective end portion of said shell to said carrier and said shell being rotatable with reference to said inner bearing elements, each of said bearing units further including an outer bearing element provided on and rotating with the respective end portion of said shell, said outer bearing elements being in indirect contact with and being rotatable relative to the respective inner bearing elements so that such inner bearing elements exhibit a tendency to rotate with said shell at least substantially exclusively as a result of indirect contact with the respective outer bearing elements; means for holding said inner bearing elements against rotation with said shell and including means for counteracting said tendency of said inner bearing elements, said counteracting means comprising stationary first arresting means and second arresting means cooperating with said first arresting means and provided on said inner bearing elements, said first arresting means comprising projections provided on said carrier and said second arresting means comprising guide faces provided on said inner bearing elements and engageable with said projections when said inner bearing elements exhibit the tendency to rotate with said shell, each of said inner bearing elements having a substantially radially extending groove and said guide faces being provided in the grooves of said inner bearing elements; and regulator means for operating said pressure transmitting units so as to effect the generation of internal forces whose components at least substantially neutralize the components of said external forces to thus maintain the axes of the end portions of said shell in said plane.

27. In a machine of the character indicated, particularly in a calender, the combination of first and second pressure rolls defining a nip and having axes normally disposed in a common supporting plane, at least one of said rolls comprising a stationary carrier; a hollow rotary cylindrical shell surrounding said carrier and having first and second end portions movable in said plane radially of the other of said rolls; groups of supporting elements installed in the interior of said shell and being spaced apart from one another, as considered in the axial direction of said shell, each of said groups including at least two supporting elements spaced apart from one another, as considered in the circumferential direction of said shell, and each of said supporting elements comprising a plurality of pressure transmitting units disposed next to each other, as considered in the circumferential direction of said shell, said shell being subject to the action of external forces having components acting at least upon the end portions of said shell substantially at right angles to said plane and said pressure transmitting units being operable to react against said carrier and transmit to said shell internal forces having components acting substantially at right angles to said plane; first and second bearing units each including an annular inner bearing element surrounded by the respective end portion of said shell, each inner bearing element being radially movably mounted on said carrier and being arranged to transmit axial stresses from the respective end portion of said shell to said carrier and said shell being rotatable with reference to said inner bearing elements, each of said bearing units further including an outer bearing element provided on and rotating with the respective end portion of said shell, said outer bearing elements being in indirect contact with and being rotatable relative to the respective inner bearing elements so that such inner bearing elements exhibit a tendency to rotate with said shell at least substantially exclusively as a result of indirect contact with the respective outer bearing elements; means for holding said inner bearing elements against rotation with said shell, including means for counteracting said tendency of said inner bearing elements, said counteracting means comprising stationary first arresting means and second arresting means cooperating with said first arresting means and provided on said inner bearing elements, one of said first and second arresting means having a pair of spaced apart guide faces for each of said bearing units and the other of said first and second arresting means having at least one projection extending with play between the respective pair of guide faces, said projections being nearer to said shell than to said carrier; and regulator means for operating said pressure transmitting units so as to effect the generation of internal forces whose components at least substantially neutralize the components of said external forces to thus maintain the axes of the end portions of said shell in said plane.

28. In a machine of the character indicated, particularly in a calender, the combination of first and second pressure rolls defining a nip and having axes normally disposed in a common supporting plane, at least one of said rolls comprising a stationary carrier; a hollow rotary cylindrical shell surrounding said carrier and having first and second end portions movable in said plane radially of the other of said rolls; groups of supporting elements installed in the interior of said shell and being spaced apart from one another, as considered in the axial direction of said shell, each of said groups including at least two supporting elements spaced apart from one another, as considered in the circumferential direction of said shell, and each of said supporting elements comprising a plurality of pressure transmitting units disposed next to each other, as considered in the circumferential direction of said shell, said shell being subject to the action of external forces having components acting at least upon the end portions of said shell substantially at right angles to said plane and said pressure transmitting units being operable to react against said carrier and transmit to said shell internal forces having components acting substantially at right angles to said plane; first and second bearing units each comprising a spherical joint and each including an annular inner bearing element surrounded by the respective end portion of said shell, each inner bearing element being radially movably mounted on said carrier and being arranged to transmit axial stresses from the respective end portion of said shell to said carrier; means for holding said inner bearing elements against rotation with said shell; and regulator means for operating said pressure transmitting units so as to effect the generation of internal forces whose components at least substantially neutralize the components of said external forces to thus maintain the axes of the end portions of said shell in said plane.

29. In a machine of the character indicated, particularly in a calender, the combination of first and second pressure rolls defining a nip and having axes normally disposed in a common supporting plane, at least one of said rolls comprising a stationary carrier; a hollow rotary cylindrical shell surrounding said carrier and having first and second end portions movable in said plane radially of the other of said rolls; groups of supporting elements installed in the interior of said shell and being spaced apart from one another, as considered in the axial direction of said shell, each of said groups including at least two supporting elements spaced apart from one another, as considered in the circumferential direction of said shell, and each of said supporting elements comprising a plurality of pressure transmitting units disposed next to each other, as considered in the circumferential direction of said shell, said shell being subject to the action of external forces having components acting at least upon the end portions of said shell substantially at right angles to said plane and said pressure transmitting units being operable to react against said carrier and transmit to said shell internal forces having components acting substantially at right angles to said plane; first and second bearing units each including an annular inner bearing element surrounded by the respective end portion of said shell, each inner bearing element being radially movably mounted on said carrier and being arranged to transmit axial stresses from the respective end portion of said shell to said carrier, each of said bearing units further comprising an annular outer bearing element provided on the respective end portion of said shell and surrounding the corresponding inner bearing element, the inner and outer bearing elements of each of said bearing units defining hydrostatic lubricating recesses therebetween; means for holding said inner bearing elements against rotation with said shell; and regulator means for operating said pressure transmitting units so as to effect the generation of internal forces whose components at least substantially neutralize the components of said external forces to thus maintain the axes of the end portions of said shell in said plane.

30. In a machine of the character indicated, particularly in a calender, the combination of first and second pressure rolls defining a nip and having axes normally disposed in a common supporting plane, at least one of said rolls comprising a stationary carrier; a hollow rotary cylindrical shell surrounding said carrier and having first and second end portions movable in said plane radially of the other of said rolls; groups of supporting elements installed in the interior of said shell and being spaced apart from one another, as considered in the axial direction of said shell, each of said groups including at least two supporting elements spaced apart from one another, as considered in the circumferential direction of said shell, and each of said supporting elements comprising a plurality of pressure transmitting units disposed next to each other, as considered in the circumferential direction of said shell, said shell being subject to the action of external forces having components acting at least upon the end portions of said shell substantially at right angles to said plane and said pressure transmitting units being operable to react against said carrier and transmit to said shell internal forces having components acting substantially at right angles to said plane; first and second bearing units each including an annular inner bearing element surrounded by the respective end portion of said shell, each inner bearing element being radially movably mounted on said carrier and being arranged to transmit axial stresses from the respective end portion of said shell to said carrier, each of said bearing units further comprising an annular outer bearing element provided on the respective end portion of said shell, the inner and outer bearing elements of each of said bearing units having cooperating end faces arranged to transmit axial stresses from said shell to said carrier and the cooperating end faces of said inner and outer bearing elements defining hydrostatic lubricating recesses therebetween; means for holding said inner bearing elements against rotation with said shell; and regulator means for operating said pressure transmitting units so as to effect the generation of internal forces whose components at least substantially neutralize the components of said external forces to thus maintain the axes of the end portions of said shell in said plane.

31. In a machine of the character indicated, particularly in a calender, the combination of first and second pressure rolls defining a nip and having axes normally disposed in a common supporting plane, at least one of said rolls comprising a stationary carrier; a hollow rotary cylindrical shell surrounding said carrier and having first and second end portions movable in said plane radially of the other of said rolls; groups of supporting elements installed in the interior of said shell and being spaced apart from one another, as considered in the axial direction of said shell, each of said groups including at least two supporting elements spaced apart from one another, as considered in the circumferential direction of said shell, and each of said supporting elements comprising a plurality of pressure transmitting units disposed next to each other, as considered in the circumferential direction of said shell, said shell being subject to the action of external forces having components acting at least upon the end portions of said shell substantially at right angles to said plane and said pressure transmitting units being operable to react against said carrier and transmit to said shell internal forces having components acting substantially at right angles to said plane; first and second bearing units each including an annular inner bearing element surrounded by the respective end portion of said shell, each inner bearing element being radially movably mounted on said carrier and being arranged to transmit axial stresses from the respective end portion of said shell to said carrier, each of said bearing units further comprising an annular outer bearing element provided on the respective end portion of said shell, the outer bearing element of at least one of said bearing units being arranged to transmit axial stresses from said shell to the respective inner bearing element; means for holding said inner bearing elements against rotation with said shell; means for transmitting axial stresses from the inner bearing element of said one bearing unit to said carrier comprising a first component provided on said carrier and a second component provided on the inner bearing element of said one bearing unit and arranged to move, with a minimum of friction, relative to said first component in response to radial movement of the respective inner bearing element with reference to said carrier, one of said components including at least one rotary element; and regulator means for operating said pressure transmitting units so as to effect the generation of internal forces whose components at least substantially neutralize the components of said external forces to thus maintain the axes of the end portions of said shell in said plane.

32. In a machine of the character indicated, particularly in a calender, the combination of first and second pressure rolls defining a nip and having axes normally disposed in a common supporting plane, at least one of said rolls comprising a stationary carrier; a hollow rotary cylindrical shell surrounding said carrier and having first and second end portions movable in said plane radially of the other of said rolls; groups of supporting elements installed in the interior of said shell and being spaced apart from one another, as considered in the axial direction of said shell, each of said groups including at least two supporting elements spaced apart from one another, as considered in the circumferential direction of said shell, and each of said supporting elements comprising a plurality of pressure transmitting units disposed next to each other, as considered in the circumferential direction of said shell, said shell being subject to the action of external forces having components acting at least upon the end portions of said shell substantially at right angles to said plane and said pressure transmitting units being operable to react against said carrier and transmit to said shell internal forces having components acting substantially at right angles to said plane; first and second bearing units each including an annular inner bearing element surrounded by the respective end portion of said shell, each inner bearing element being radially movably mounted on said carrier and said shell being rotatable with reference to said inner bearing elements, each of said bearing units further including an outer bearing element provided on and rotating with the respective end portion of said shell, said outer bearing elements being in indirect contact with and being rotatable relative to the respective inner bearing elements so that such inner bearing elements exhibit a tendency to rotate with said shell at least substantially exclusively as a result of indirect contact with the respective outer bearing elements; means for holding said inner bearing elements against rotation with said shell including means for counteracting said tendency of said inner bearing elements, said counteracting means comprising stationary first arresting means and second arresting means cooperating with said first arresting means and provided on said inner bearing elements, said second arresting means having limited regulation facilitating freedom of angular movement with reference to said first arresting means; regulator means for operating said pressure transmitting units so as to effect the generation of internal forces whose components at least substantially neutralize the components of said external forces to thus maintain the axes of the end portions of said shell in said plane; signal generating means for monitoring the positions of the end portions of said shell with reference to said carrier; and means for influencing said regulator means as a function of signals denoting the monitored positions of said end portions.

* * * * *